(12) United States Patent
Jackson

(10) Patent No.: US 10,577,059 B2
(45) Date of Patent: Mar. 3, 2020

(54) METHOD AND SYSTEM FOR SURFBOARD CONSTRUCTION

(71) Applicant: Kyle Jackson, Encinitas, CA (US)

(72) Inventor: Kyle Jackson, Encinitas, CA (US)

(*) Notice: Subject to any disclaimer, the term of this patent is extended or adjusted under 35 U.S.C. 154(b) by 0 days.

(21) Appl. No.: 15/659,347

(22) Filed: Jul. 25, 2017

(65) Prior Publication Data

US 2018/0029675 A1    Feb. 1, 2018

Related U.S. Application Data

(60) Provisional application No. 62/367,039, filed on Jul. 26, 2016.

(51) Int. Cl.
*B63B 35/79*      (2006.01)
*B32B 21/13*      (2006.01)

(52) U.S. Cl.
CPC .......... *B63B 35/7906* (2013.01); *B32B 21/13* (2013.01); *B32B 2250/03* (2013.01)

(58) Field of Classification Search
CPC ..... B63B 35/73; B63B 35/79; B63B 35/7906; B63B 35/7916; B63B 3/00; B32B 21/13
USPC .......................................................... 441/74
See application file for complete search history.

(56) References Cited

U.S. PATENT DOCUMENTS

| | | | | |
|---|---|---|---|---|
| 1,830,015 A | * | 11/1931 | Carmichael | B63B 35/7916 441/74 |
| 4,209,867 A | * | 7/1980 | Abrams, III | B63B 35/7906 441/74 |
| 4,973,507 A | * | 11/1990 | Horian | B32B 21/02 428/102 |

* cited by examiner

*Primary Examiner* — Lars A Olson

(57) ABSTRACT

The present invention includes a surfboard comprising a laminated frame extending along the side rails of the surfboard, the laminated frame comprising three or more layers of laminates, and wherein the laminated frame has been formed to the shape of the rocker of the surfboard. In various exemplary embodiments, the laminated frame may have one or more lateral members extending between opposing sides of the laminated frame, wherein such lateral members may be circular in cross-section, and may include one or more supports connecting the lateral members to the top surface of the surfboard. In various exemplary embodiments, two or more layers of laminates may form an internal structure extending laterally across the laminated frame from one side to the other.

7 Claims, 16 Drawing Sheets

METHOD AND SYSTEM FOR SURFBOARD CONSTRUCTION

This application claims the benefit of U.S. Provisional Patent Application No. 62/367,039 filed on Jul. 26, 2016, which is incorporated by reference in its entirety as if set forth herein.

FIELD OF THE INVENTION

The present invention is directed to a surfboard or similar structure and a method for construction of a surfboard or similar structure.

BACKGROUND

For many decades surfboards and similar structures such as paddleboards have been constructed entirely or partially out of various kinds of wood. For example, early surfboards were simply long wooden planks. Later wooden surfboards were manufactured using a variety of construction techniques to reduce weight and improve performance. However, these construction techniques have remained challenging, both because they are difficult to undertake and because the resulting boards have remained extremely heavy and lack consistent performance characteristics.

For example, one of the most common techniques for making a wooden surfboard involves making an extremely large balsa wood block, cutting out the outline of the board and then shaping in board rocker by physically removing large amounts of wood. This structure is then knocked apart so that chambers can be drilled throughout the inner structure to reduce weight and improve buoyancy, and then the structure is reassembled into a finished surfboard. This construction process is difficult, wasteful, and the resulting boards are heavy and lack significant internal stored energy that provides improved performance. Thus, despite the aesthetic and cultural appeal of wooden boards, most current surfboards and paddleboards are constructed using a core material of foam or a similar lightweight, highly buoyant material, wrapped in fiberglass or similar materials.

The present invention is a wooden surfboard or paddleboard that is lighter, allows for greater design flexibility, and has significantly better performance than prior art wooden surfboards and paddleboards, as well as the construction method used to create such boards.

SUMMARY OF THE INVENTION

The present invention includes s surfboard comprising a laminated frame extending along the side rails of the surfboard, the laminated frame comprising three or more layers of laminates, and wherein the laminated frame has been formed to the shape of the rocker of the surfboard. In various exemplary embodiments, the laminated frame comprises wood laminates, including hardwood laminates, softwood laminates, or both hardwood and softwood laminates. In various exemplary embodiments, the laminated frame comprises wood and non-wood laminates. In various exemplary embodiments, the laminated frame may have one or more lateral members extending between opposing sides of the laminated frame, wherein such lateral members may be circular in cross-section, and may include one or more supports connecting the lateral members to the top surface of the surfboard. In various exemplary embodiments, the surfboard further comprises strips of wood planking forming the top surface and/or bottom surface of the surfboard. In various exemplary embodiments, two or more layers of laminates may form an internal structure extending laterally across the laminated frame from one side to the other.

DETAILED DESCRIPTION

Figure 1:
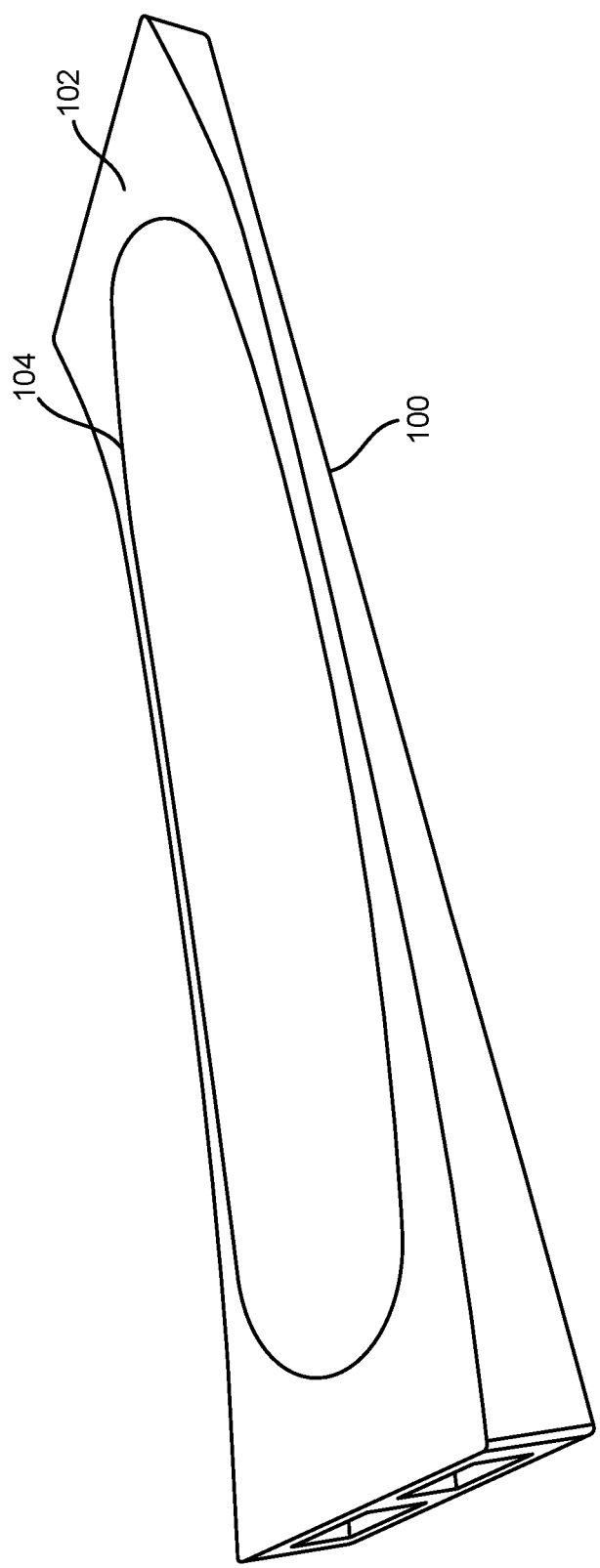
FIG. 1 is a drawing of an exemplary embodiment of a rocker table.

The following description is presented to enable any person skilled in the art to make and use the invention. For purposes of explanation, specific nomenclature is set forth to provide a thorough understanding of the present invention. Descriptions of specific embodiments or applications are provided only as examples. Various modifications to the embodiments will be readily apparent to those skilled in the art, and general principles defined herein may be applied to other embodiments and applications without departing from the spirit and scope of the invention. Thus, the present invention is not intended to be limited to the embodiments shown, but is to be accorded the widest possible scope consistent with the principles and features disclosed herein.

While the various exemplary embodiments disclosed herein will be described with respect to surfboards, it will be readily understood by those skilled in the art that the same process and structure can be used in connection with other similar or related products including without limitation paddleboards, stand up paddleboards (SUPs), and body boards. The present invention is also described with reference to the use of wood as the primary construction material, but it will be readily understood by those of skill in the art that other suitable materials can be used for some or all of the components described herein.

In various exemplary embodiments, a surfboard has a laminated frame. The laminated frame is built up using layers of material referred to herein as "laminates." These are thin layers or strips of an appropriate material that are attached together using an adhesive. The present invention will be described primarily with reference to the use of wood strips for the laminates, but any other suitable material or combinations of materials can be used for the laminates. For example, the laminated frame may be built from a combination of wood and composite laminates to develop specific desired board characteristics. Different types of the same material—such as hardwoods and softwoods—may also be used for different layers to develop particular strength, weight, flex, or other characteristics. For example, the laminated frame might include layers of balsa or another light, soft wood mixed with layers of hardwood rather than having all layers of hardwoods to reduce the weight of the laminated frame. Laminates comprised of any single material or any combination of materials may be used, and any combination of such laminates may be used.

In various exemplary embodiments, the laminates used to construct the laminated frame may be strips of material generally two (2) inches or less in width and typically $\frac{1}{16}$ to $\frac{3}{16}$ of an inch thick. Thinner or thicker laminates may be used in particular circumstances or to achieve particular frame characteristics. The laminates may be any suitable length based on the length of the laminated frame being constructed, and the lengths of the individual laminates used on a frame may vary significantly depending on the size and shape of the laminated frame and the overlaps desired.

Surfboards are typically not flat. Rather, most surfboards are complex three-dimensional structures having a certain total length, variable width, variable thickness, and significant curvature from front to back along the longitudinal axis of the surfboard. This curvature along the length of the surfboard is commonly referred to as "rocker." The amount and the location of rocker along the length of the board may differ significantly among different types and styles of surfboards, but virtually all modern surfboards have some amount of rocker.

Figure 2:
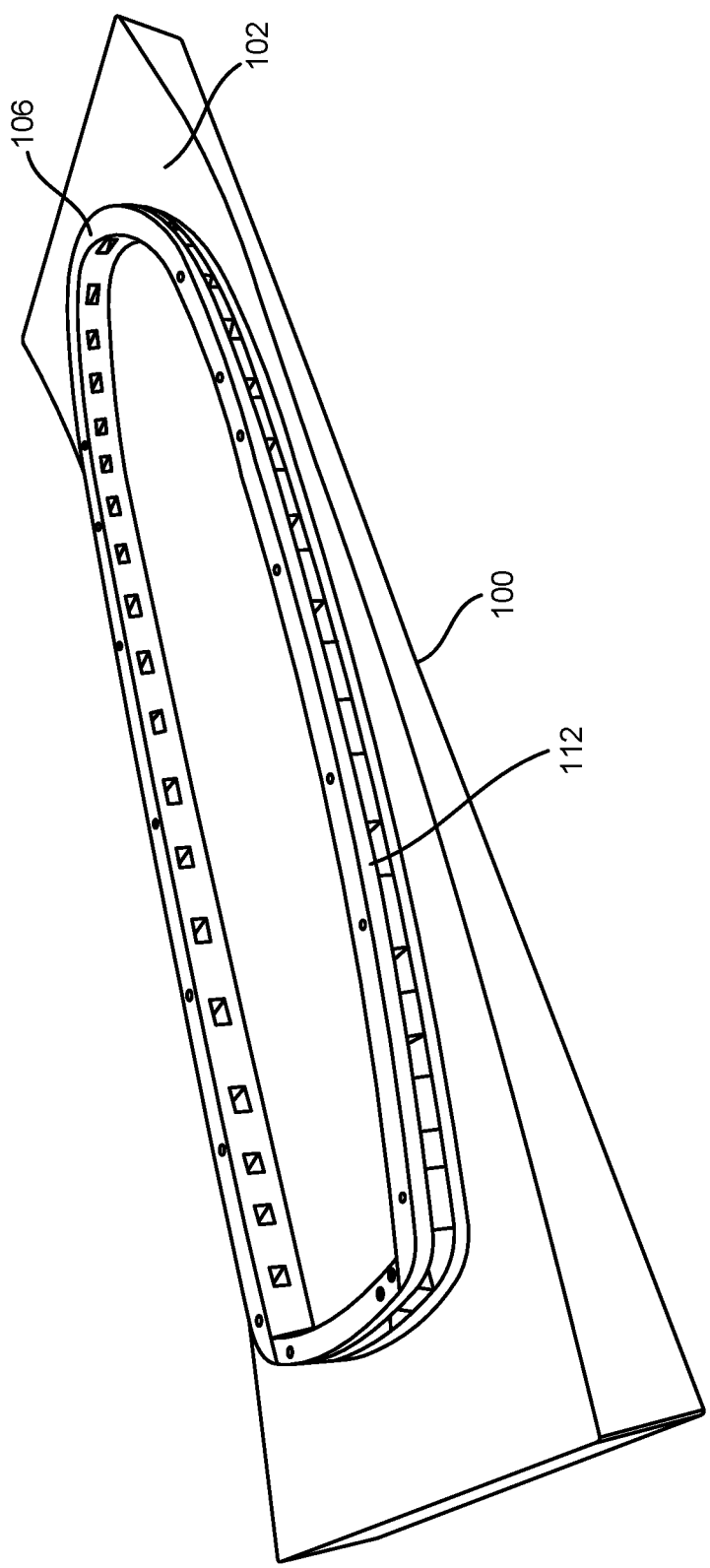
FIG. 2 is a drawing of an exemplary embodiment of a rocker table with a jig on it.

In various embodiments, the present invention uses a curved form referred to herein as a rocker table to define and establish the rocker for the laminated frame. Referring to FIGS. 1 and 2, an exemplary embodiment of a rocker table 100 is shown. The rocker table may be built from plywood or any other suitable material including wood, laminated materials, metal, plastic, etc. While the final rocker of a board can be influenced by removal of material during the shaping process, the curvature of the top surface 102 of the rocker table 100 defines the rocker profile for the laminated frame, and the approximate rocker profile for the completed board.

Two-dimensional surfboard templates are commonly used for construction of virtually all types of surfboards to establish the outline shape of the board in terms of its length and width. In various exemplary embodiments of the present invention, a surfboard template reflecting the intended outline shape of the board may be used to build a jig for construction of the laminated frame. In various exemplary embodiments a template of the board shape can be placed on the rocker table, or as shown in FIG. 1 the outline of the template may be marked 104 on the top surface 102 of the rocker table.

As shown in FIG. 2, a jig 106 may then be built in the shape of the outline of the template and removably or permanently affixed to the top surface 102 of the rocker table 100. For example, the jig may be built of plywood cut to the correct shape and routered to establish a clean, precise, form, then pinned to the top surface of the rocker board using wood screws. If a template is not used, the jig 106 can just be built to the desired shape. Because the laminated frame is built up from the inside to the outside, with the first layer of laminate in direct contact with the jig 106, the outside working surface 112 of the jig 106 should be set back from the desired final shape of the board by the anticipated thickness of the laminated frame. The jig 106 will generally be approximately the same thickness as the width of the laminates to be used for the laminated frame, and is used as a form against which the laminates are pressed during construction of the laminated frame. The jig 106 can be constructed from any suitable materials and affixed to the top surface 102 of the rocker table 100 using any appropriate technique including suitable fasteners, adhesives, etc.

Figure 3:
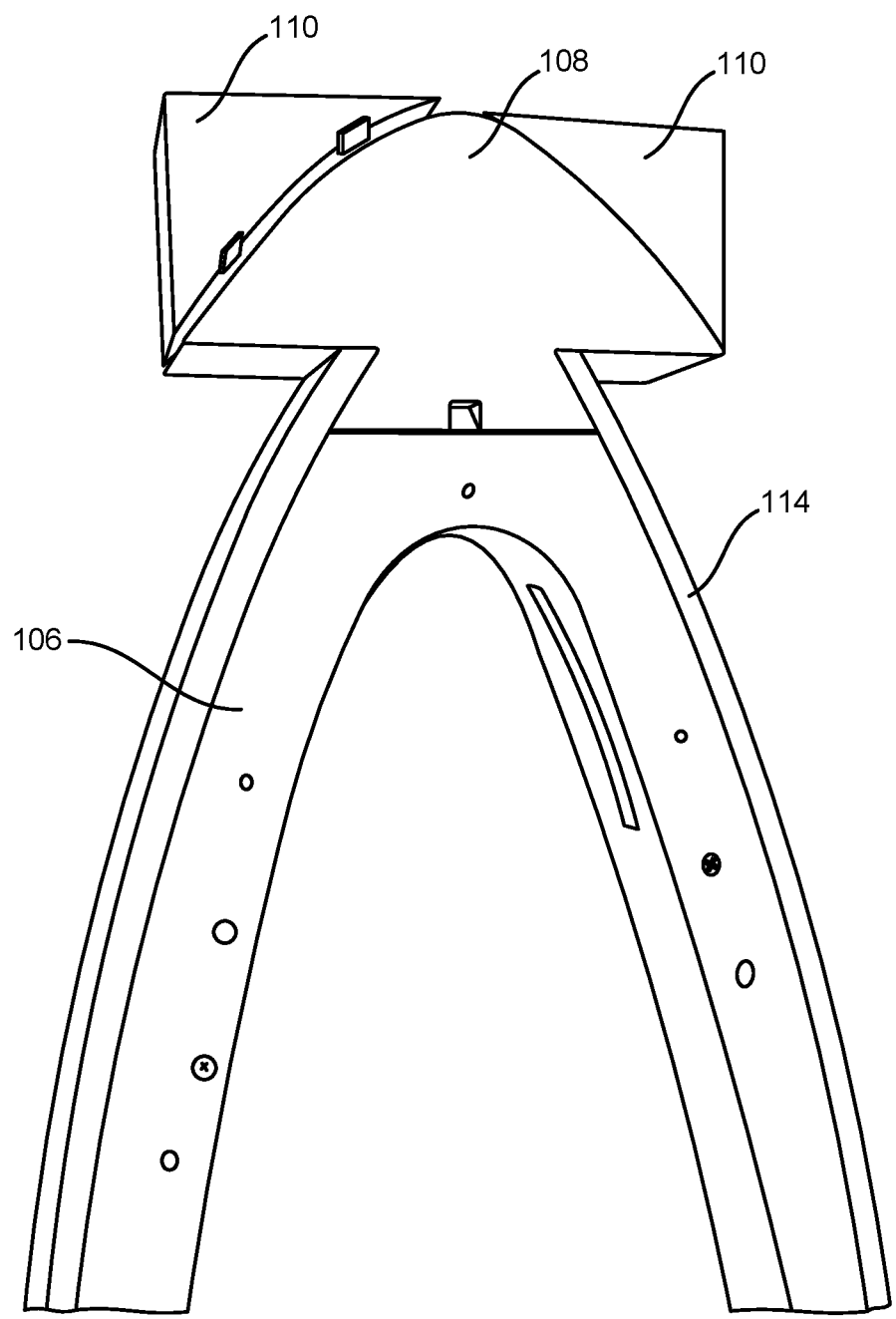
FIG. 3 is a drawing of an exemplary embodiment of a jig with a nose block positioned during construction of a laminated frame.

Blocks of wood or other material are commonly used in the nose and/or tail areas of surfboards as structural or decorative elements. Such nose blocks and tail blocks may be constructed from wood or any other suitable material. Referring to FIG. 3, in various exemplary embodiments of the present invention, a nose block 108 and/or tail blocks may be used in the construction of the laminated frame. Such blocks may be cut to size and shape, and then placed at the appropriate location on the outer surface of the jig 106. Supporting structures 110 may be used to help maintain such blocks in position during the laminating process. If used, blocks may be decorative or structural, and may provide supporting structure at stress points within the laminated frame. As shown in FIG. 3, a block may be shaped such that the laminates 114 that form the laminated frame connect to the block on one or more surfaces. Blocks may also include additional material that is removed when the laminated frame is complete to attain the final intended shape. Blocks may also be positioned so that one or more laminates wrap around their outer surfaces so that they are completely internal to the laminated frame.

Once the jig 106 is affixed to the rocker table 100 and any blocks are positioned, the laminated frame can be constructed. If wood is used as the material for the laminates, as is commonly understood by those skilled in the art the wood laminates must be prepared in advance for forming. Moisture must be taken up into the wood to soften the wood fibers and allow the laminates to bend to the shape of the jig and the rocker table. The moisture may be introduced into the wood by any commonly known technique including soaking and steaming the laminates. In various exemplary embodiments, the wood laminates are soaked in water for several days prior to construction of the frame so that they are deeply saturated. Laminates made from other materials may be treated as necessary to be sufficiently flexible for forming.

Figure 4:
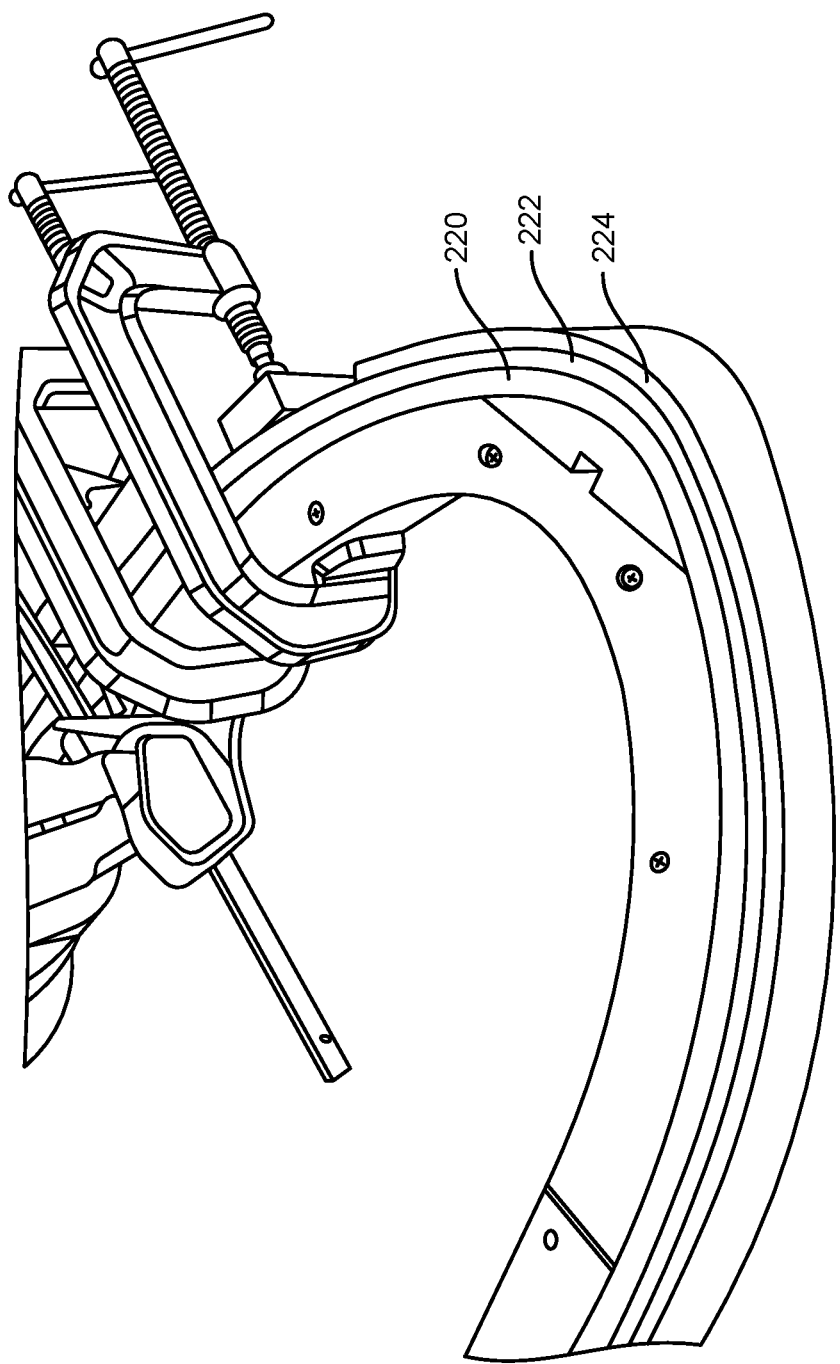
FIG. 4 is a drawing of an exemplary embodiment of a jig with laminates clamped in position.
Figure 5:
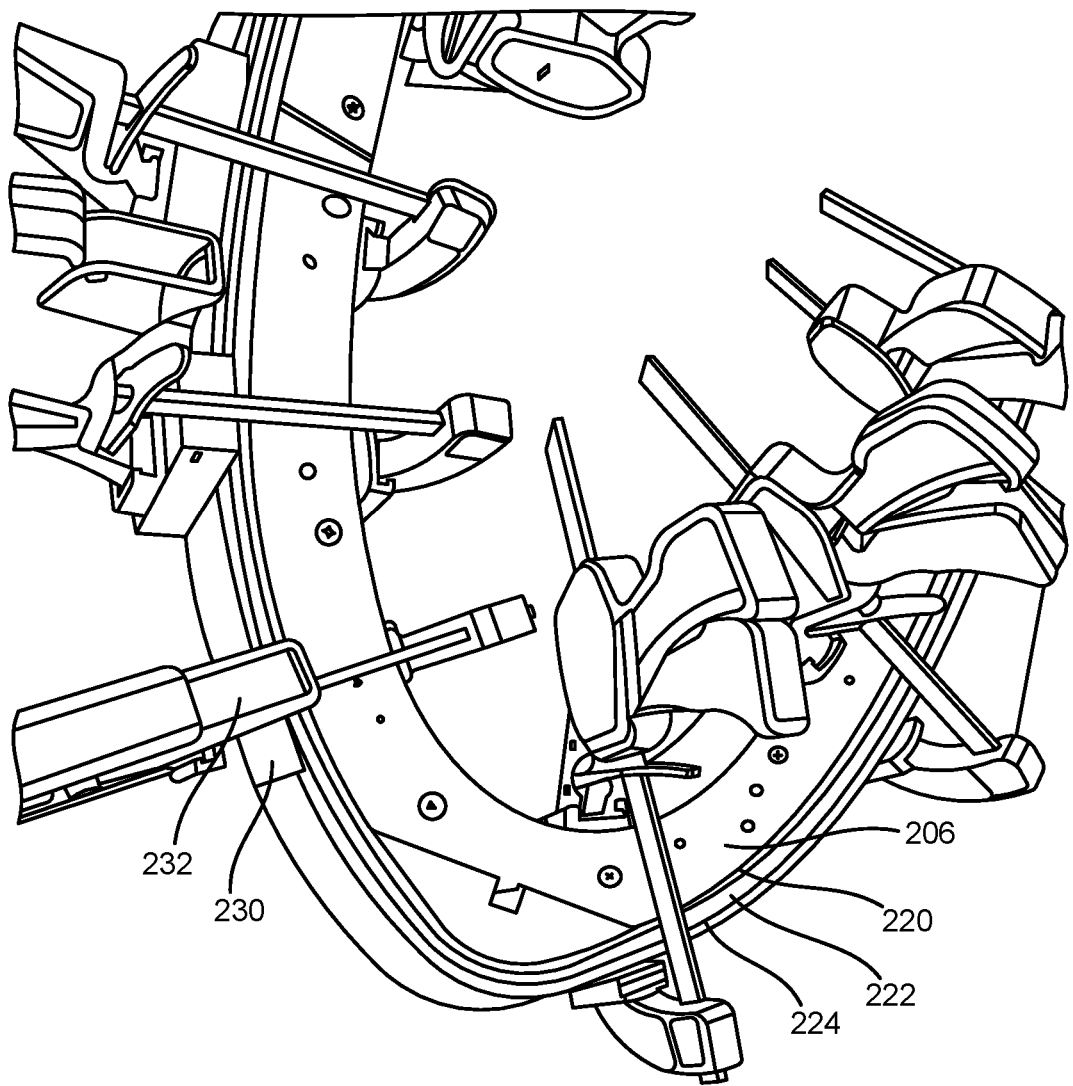
FIG. 5 is a drawing of an exemplary embodiment of a jig with laminates clamped in position and a metal plate used to distribute clamping pressure.

Referring to FIGS. 4 and 5, in various exemplary embodiments, a first layer of laminate 220 is placed against a jig 206 by applying lateral pressure to form the laminate to the outer lateral surface of the jig. At the same time, vertical pressure must be applied to the laminate to form the laminate to the curvature of the rocker table, and clamps may be used to hold the laminate in position against the jig and the rocker table. As appropriate, particularly long laminates may be used for the first layer to minimize the number of seams. In addition, any seams in the first layer of laminate may be positioned in areas of relatively low stress on the frame to create a strong inner structure for the laminated frame. The first layer of laminate is not bonded in any way to either the jig or the rocker table, but is just firmly abutted to the surface of each and held firmly in place. An appropriate adhesive such as glue may be used to bond the first layer of laminate to any blocks that will be part of the laminated frame.

A second layer of laminate 222 may then be applied. An adhesive is used between the first laminate 220 and the second laminate 222 and between all subsequent layers of laminate to strongly bond the layers of the laminated frame together. The laminates used in the second layer may be selected and positioned to assure that any seams in the second layer of laminates are substantially offset from any seams in the first layer of laminates. Such staggering of any seams in the first and second layers, and in subsequent layers of laminates, insures that there are no weak points in the laminated frame. As with the first layer of laminates, lateral pressure is applied to form the second layer of laminates to the first layer of laminates, and vertical pressure is applied to form the second layer of laminates to the curvature of the rocker table. The second layer of laminates is then clamped firmly in place until the adhesive is fully set. Any appropriate number of additional layers of laminate can be applied in the same way.

To assure that a firm bond is formed between the layers of laminates (e.g. 220, 222, 224), pressure may be relatively equally distributed along the area of bonding by using an array of clamps 232. In various exemplary embodiments, pressure from the clamps may be spread across a larger area of the laminate by using a structure that will disperse the point force of the clamps across a broader area of the laminates being bonded. In various exemplary embodiments steel or aluminum forms 230 may be placed against the outermost laminate and one or more clamps 232 may apply pressure that is dispersed along the metal form. Wood forms can also be used to distribute the force of the clamps across a broader area.

In various exemplary embodiments, each layer within the laminated frame overlaps the adjacent layers and any seams are staggered. By staggering the seams this way, the frame maintains maximum strength and weak spots in the frame structure are avoided. With proper preparation, laminates can be formed around relatively sharp curves such as the nose of the board to reduce any risk of separation at the seams between individual laminates in a particular layer. When using fibrous laminates such as natural wood, this results in a laminated frame with continuous fibers extending through critical points in the frame to store energy and improve the overall strength of the frame.

Figure 6:
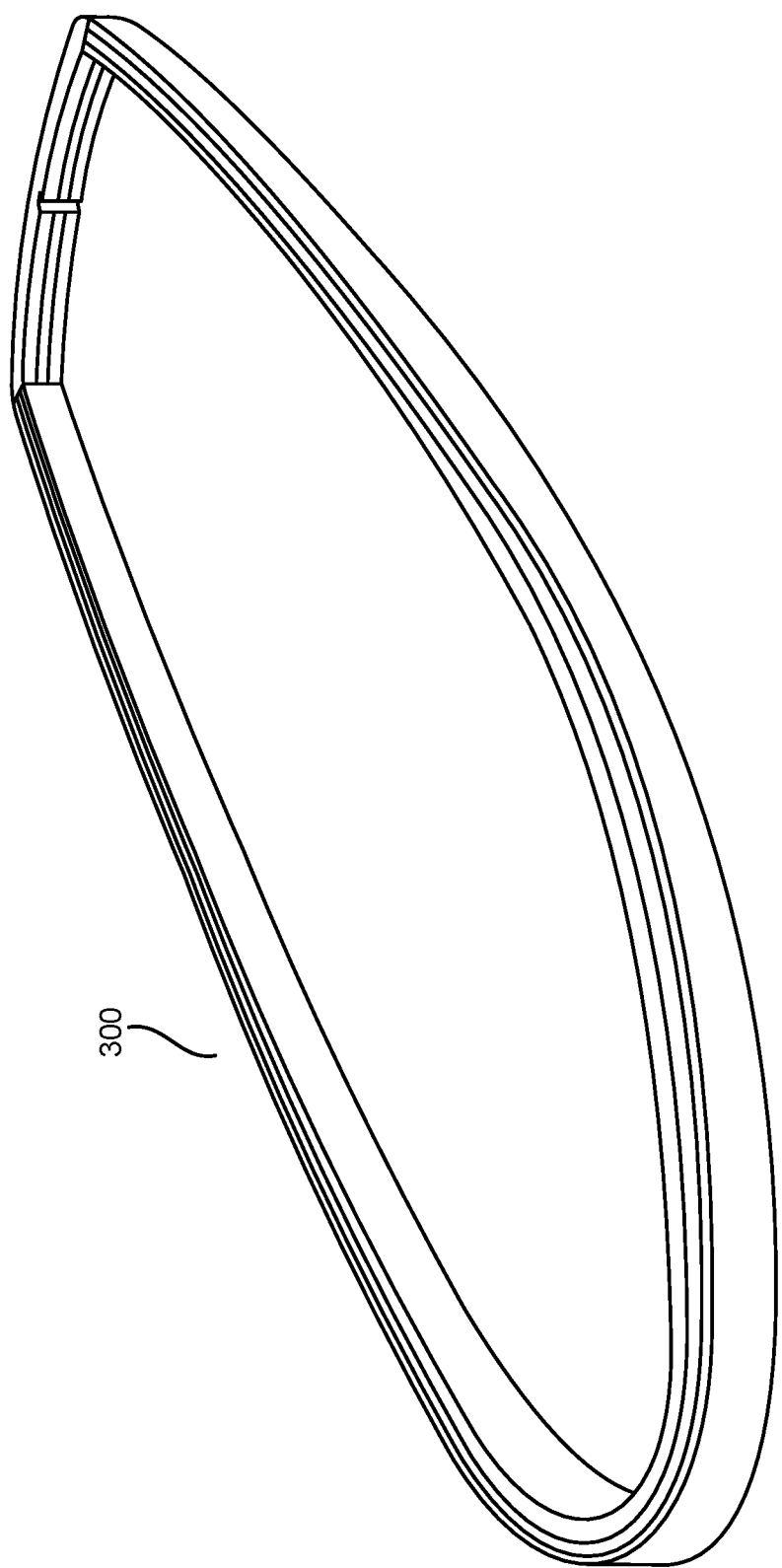
FIG. 6 is a drawing of an exemplary embodiment of a laminated frame after being removed from the jig and rocker table.

After all the layers of laminate have been bonded together and the adhesives have cured, all of the clamps can be removed and the laminated frame can be removed from the jig and rocker table. Referring to FIG. 6, the resulting laminated frame 300 has the approximate three-dimensional shape of the final surfboard design, having both the approximate external template shape and the approximate rocker of the final surfboard. Such a laminated frame is relatively light and may be very rigid, with substantial stored energy locked into the laminate structure by the three-dimensional forming of the laminates against both the jig and the rocker table.

Figure 7:
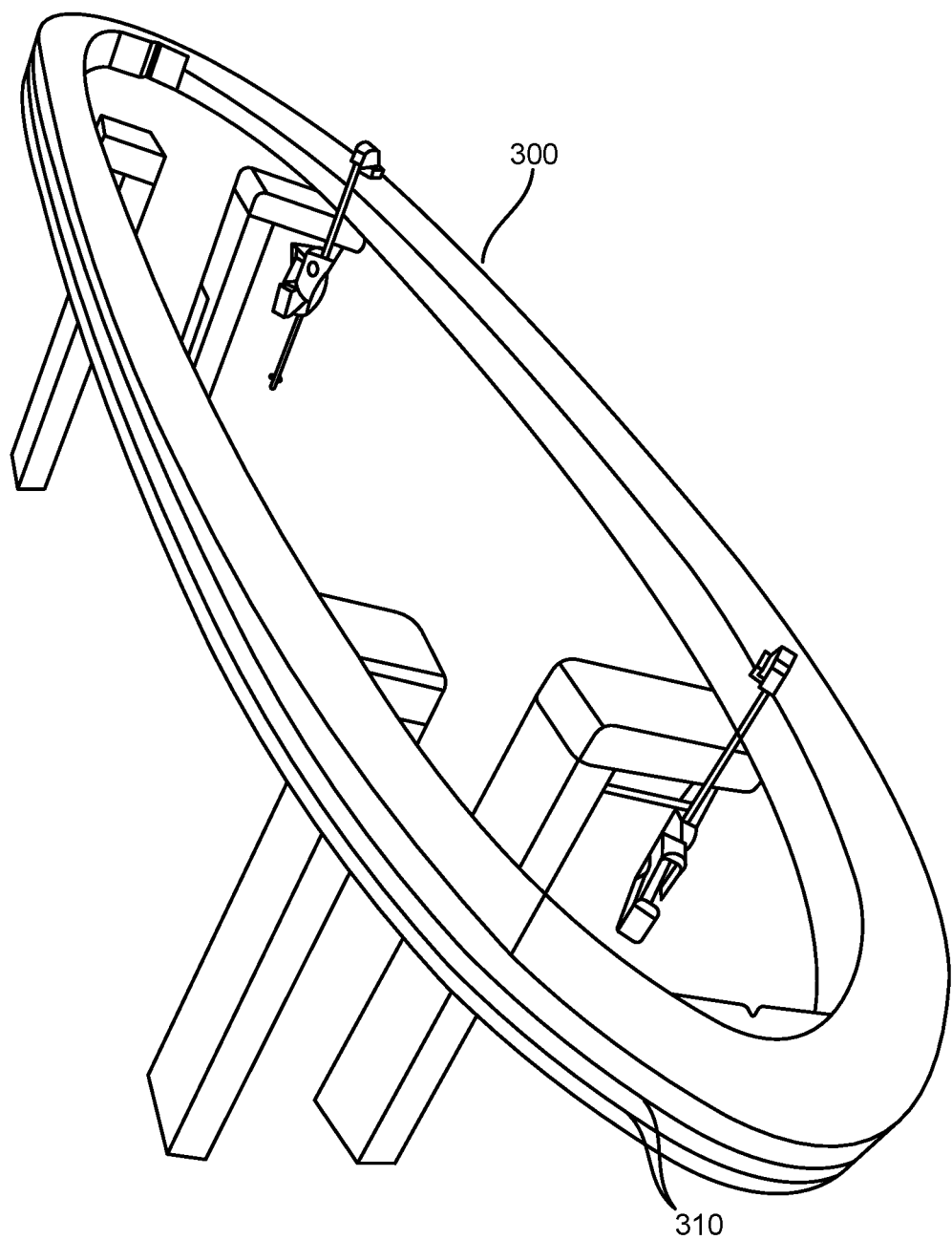
FIG. 7 is drawing of an exemplary embodiment of a laminated frame clamped vertically with sidewalls scribed.

Referring to FIG. 7, to further refine the three-dimensional shape of the surfboard, the laminated frame 300 may be scribed along the sides with depth lines 310, and material may be removed from areas where changes in the thickness of the laminated frame are needed to achieve the final board shape. Note that for simplicity the layers of laminates have not been shown in FIG. 7 to more easily show the scribing along the sides of the laminated frame. Unlike traditional methods of making wooden surfboards that require the removal of large amounts of material to create both the outline and rocker, the approximate outline and rocker have already been built into the laminated frame 300. In this way, material removal in the shaping process is minimized. Where wood or other fibrous laminates are used, the fibers of the the laminates have been largely maintained intact. By maintaining the natural fibers of the laminate material and forming them to the shape of the board rather than cutting across the fibers to remove material to establish outline and rocker, the laminated frame 300 has substantial natural resilience and stored energy.

Figure 8:
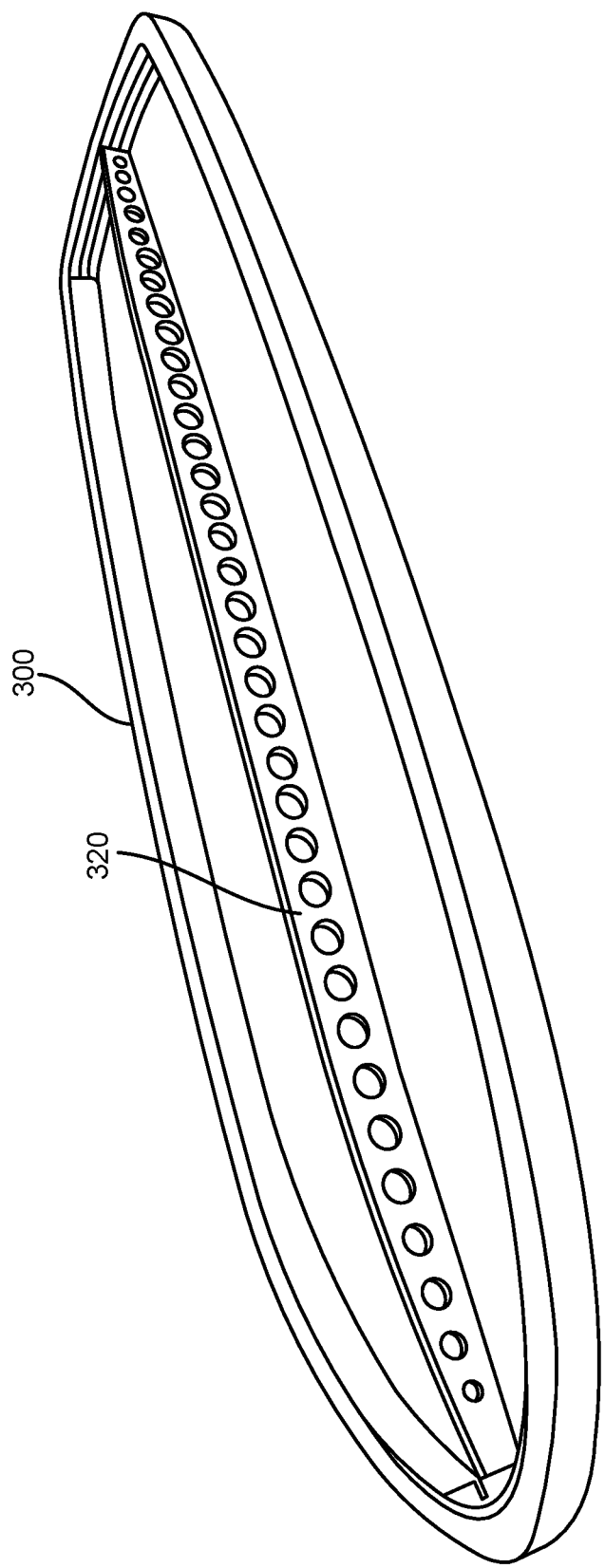
FIG. 8 is drawing of an exemplary embodiment of a laminated frame with a central stringer attached.
Figure 9:
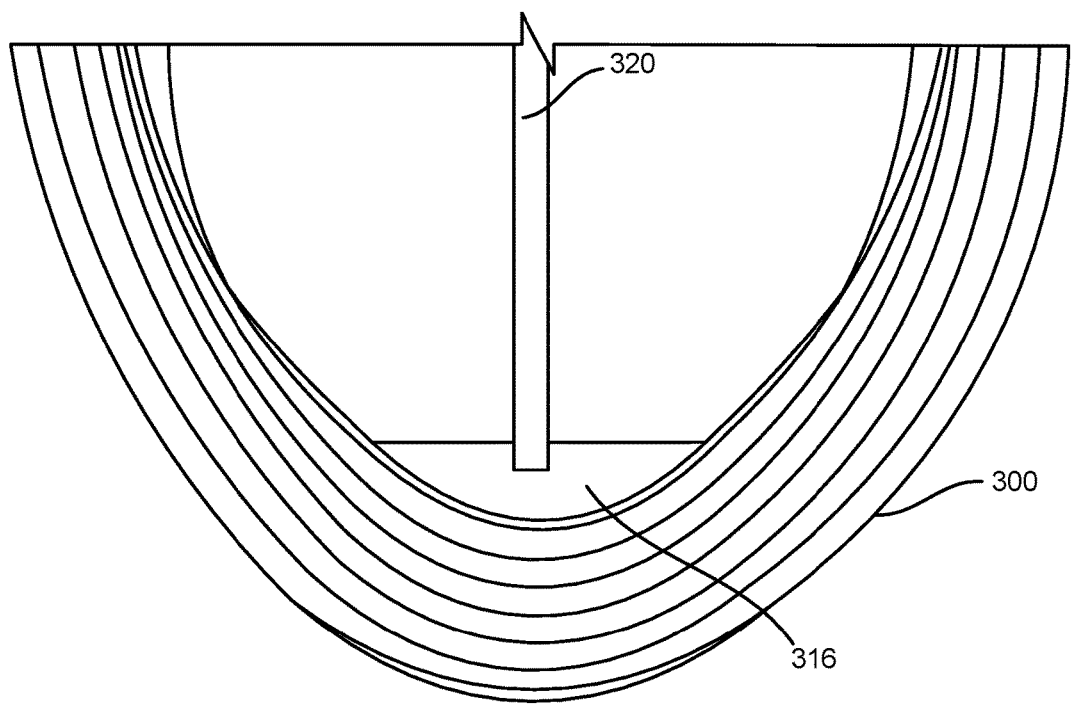
FIG. 9 is drawing of a plan view of the nose area of an exemplary embodiment of a laminated frame with a nose block and central stringer.
Figure 10:
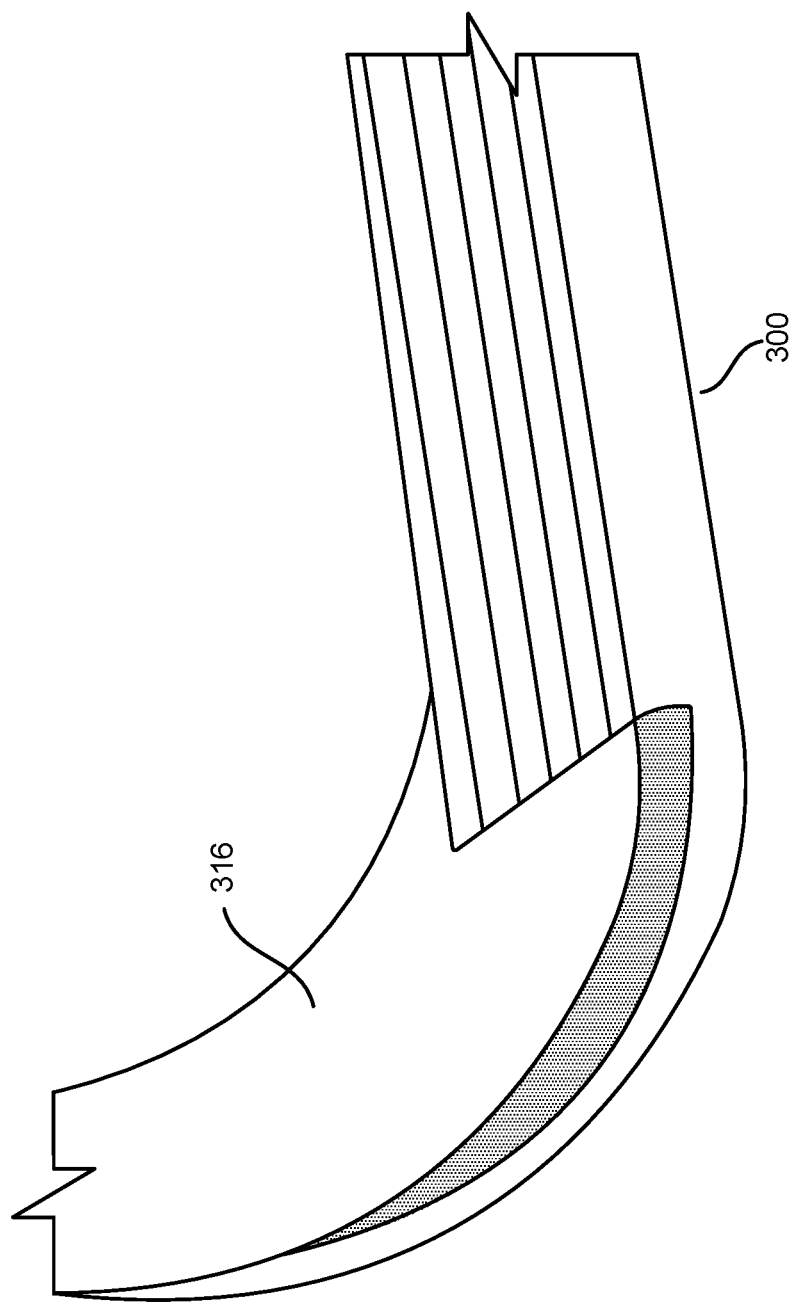
FIG. 10 is drawing of a perspective view of the tail corner area of an exemplary embodiment of a laminated frame with a tail block.

To complete the surfboard, stringers or other internal structural elements may be attached and top and bottom surfaces may be installed in the open central area of the laminated frame. Referring to FIGS. 8 and 9, in various exemplary embodiments, one or more traditional longitudinal stringers 320 can be attached to provide structural support to greater longitudinal stiffness. Referring to FIG. 10, elements such as tail blocks 316 can be worked to their final shape as they are fully integrated with the laminated portions of the frame.

Figure 11:
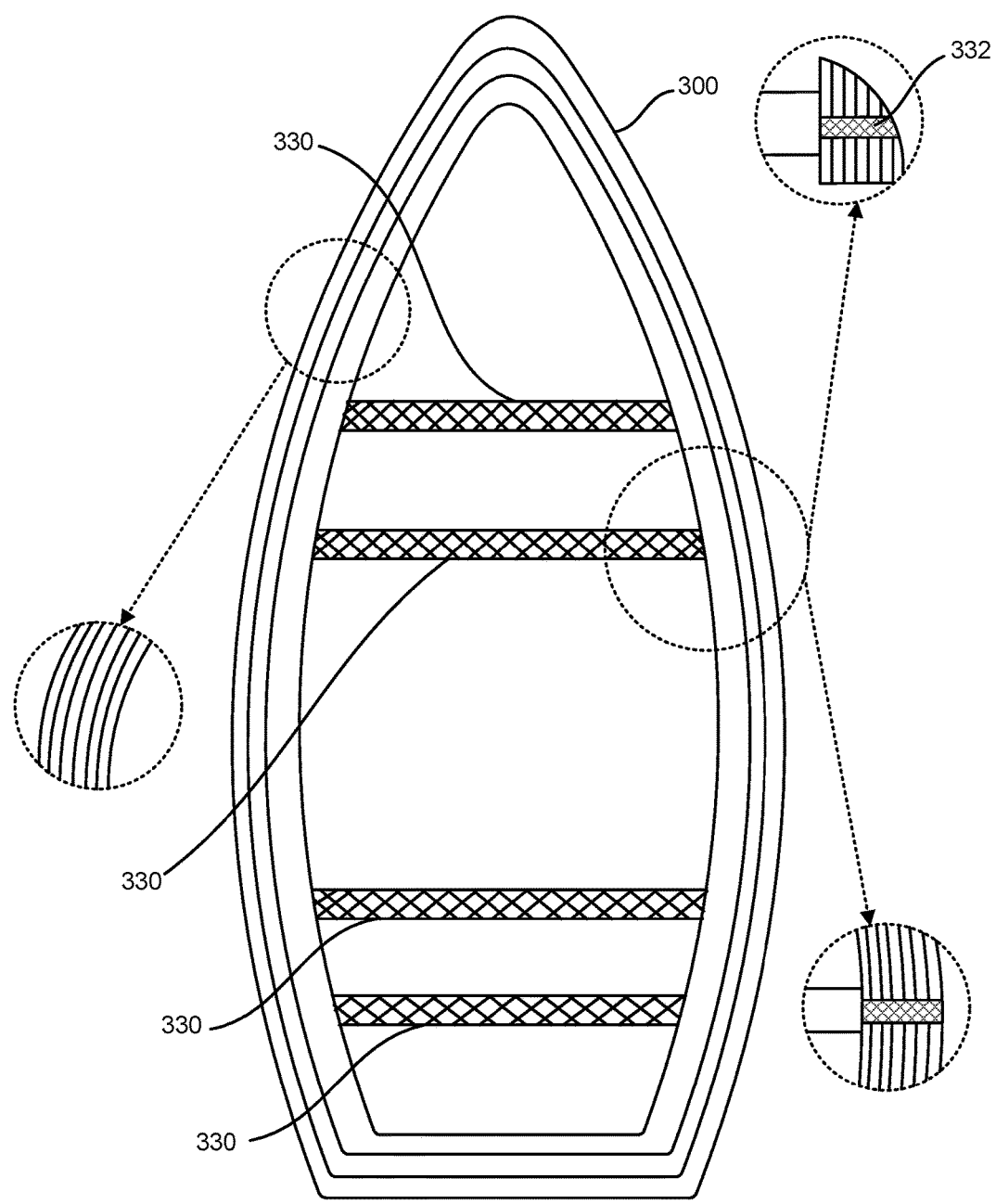
FIG. 11 is an explanatory drawing showing a plan view of an exemplary embodiment of a laminated frame with lateral bars to connect rails and provide for torsional rigidity and detail sections.
Figure 16:
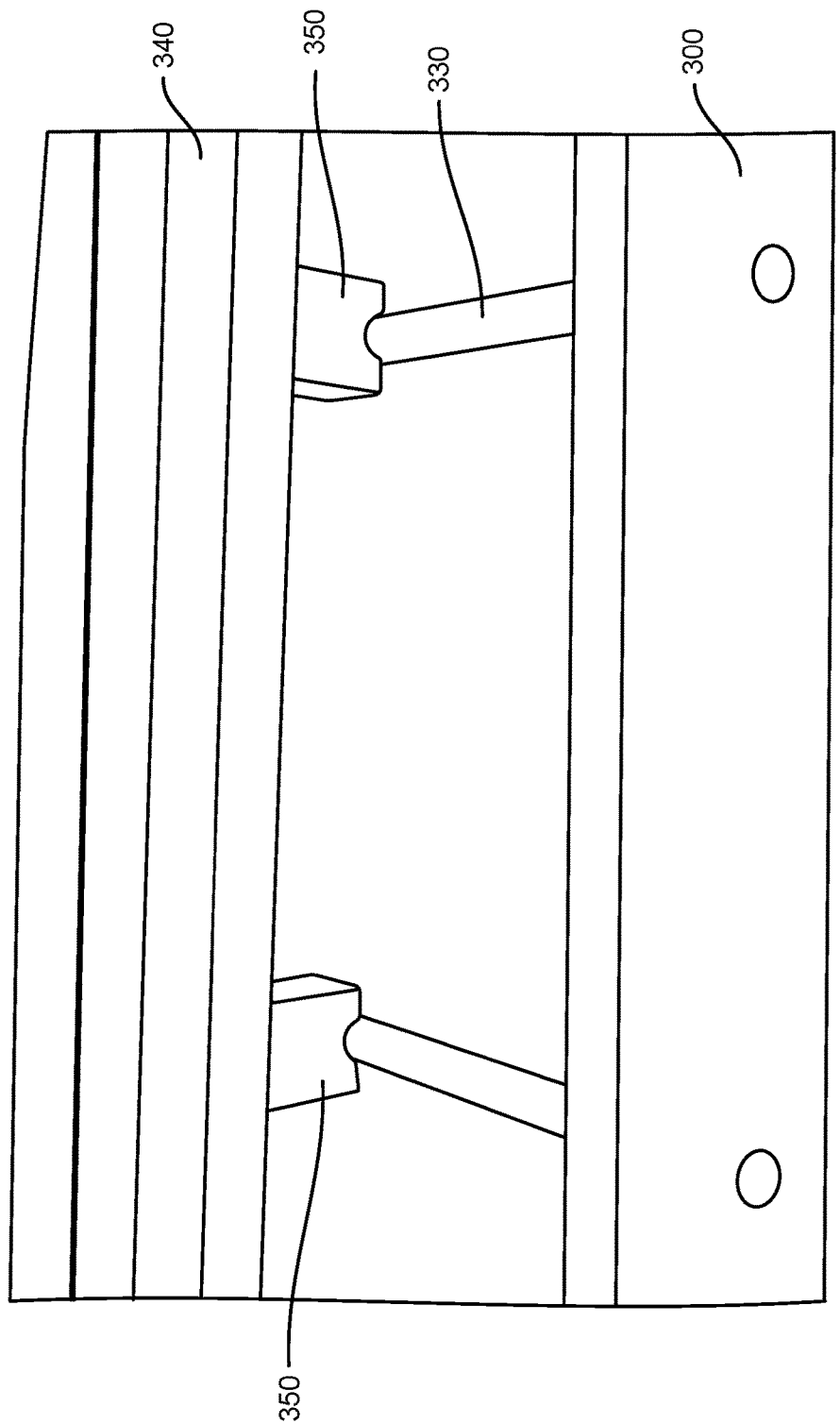
FIG. 16 is a drawing of an exemplary embodiment of a frame with lateral bars and spacers between the lateral bars and deck planking.

Referring to FIGS. 11 and 16, in various exemplary embodiments, one or more lateral members 330 may be attached between the opposing side rails of the laminated frame 300. For example, lateral members 330 made of hardwood, laminate, carbon fiber, or any other appropriate material may be attached between the opposing rails. In various exemplary embodiments, such lateral members may be attached in locations where the surfer's feet would be placed to improve energy transfer throughout the board and/or to provide torsional stiffness. While shown extending generally perpendicular to the longitudinal axis of the board, such members may be attached at other angles between the sides of the laminated frame 300.

While shown in FIGS. 11 and 16 as dowel rods having a circular cross-section such that they do not touch the upper or lower decking within the hollow center of the board, lateral members 330 may have any cross-sectional shape and dimension such that they fit within the hollow center of the board, contact the decking on the top and/or bottom of the board, or even extend to the top and/or bottom surface and are integrated with the decking. Referring to FIG. 16, if lateral members 330 do not touch the upper or lower decking, one or more supports 350 connecting a lateral member to the upper or lower decking can be provided.

The connections between such internal members and the laminated frame, as well as any connections between any blocks and the laminated frame may be established using any suitable technique, including without limitation adhesives, dowels 332, mortise and tenon or dovetails joints, mechanical fasteners, etc.

Figure 12:
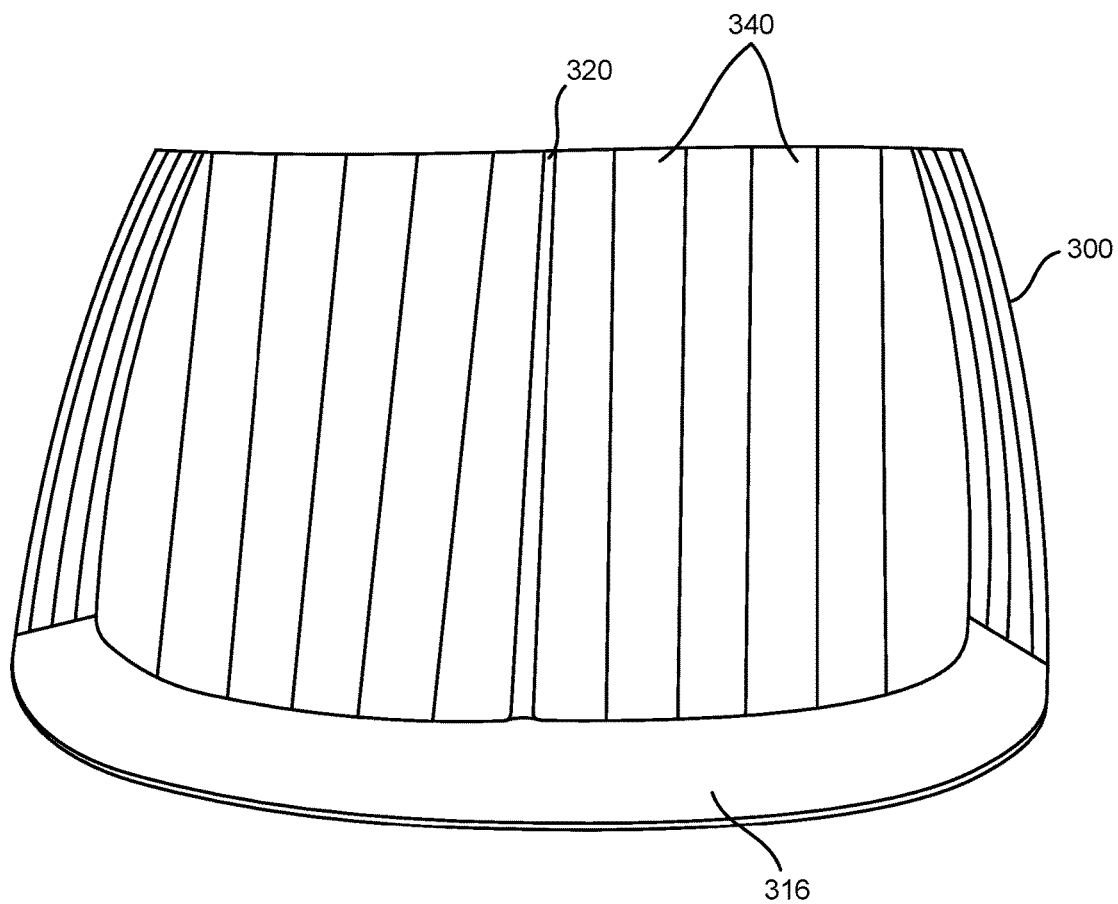
FIG. 12 is a drawing of a perspective view of the tail portion of an exemplary embodiment of a laminated frame with a central stringer and deck planking in place.
Figure 13:
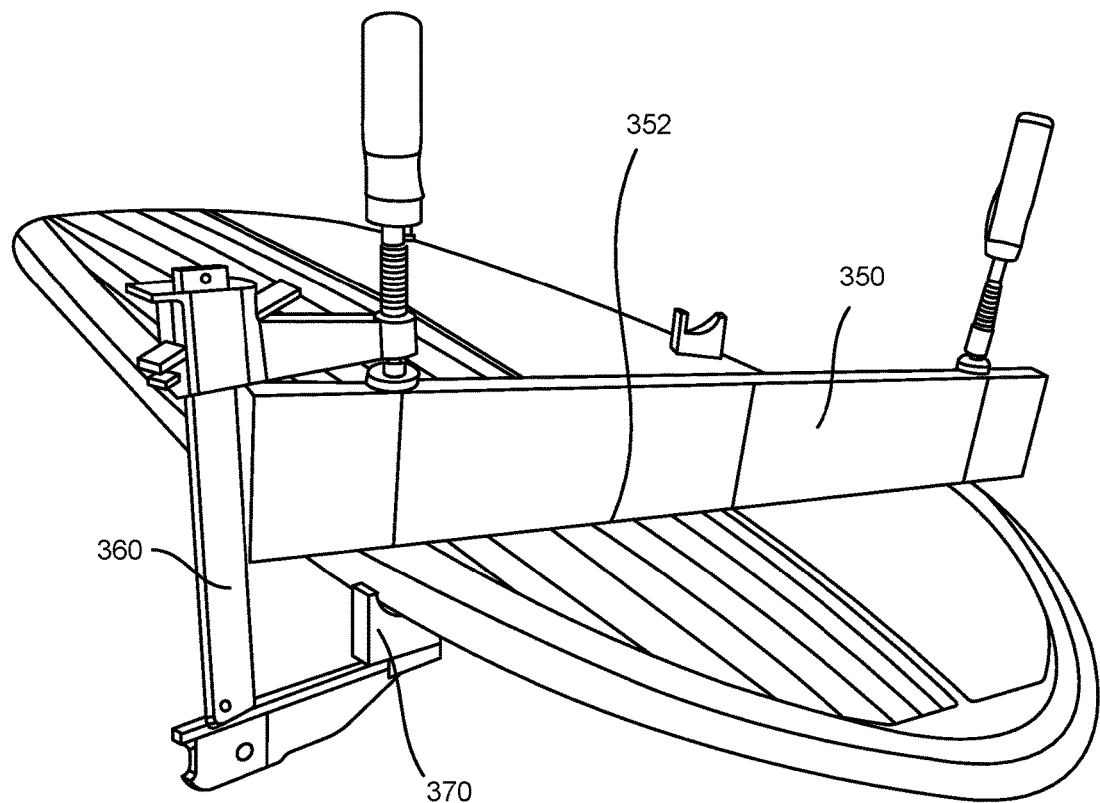
FIG. 13 is a drawing of a perspective view of an exemplary embodiment of a laminated frame with a central stringer and deck planking clamped in position.
Figure 14:
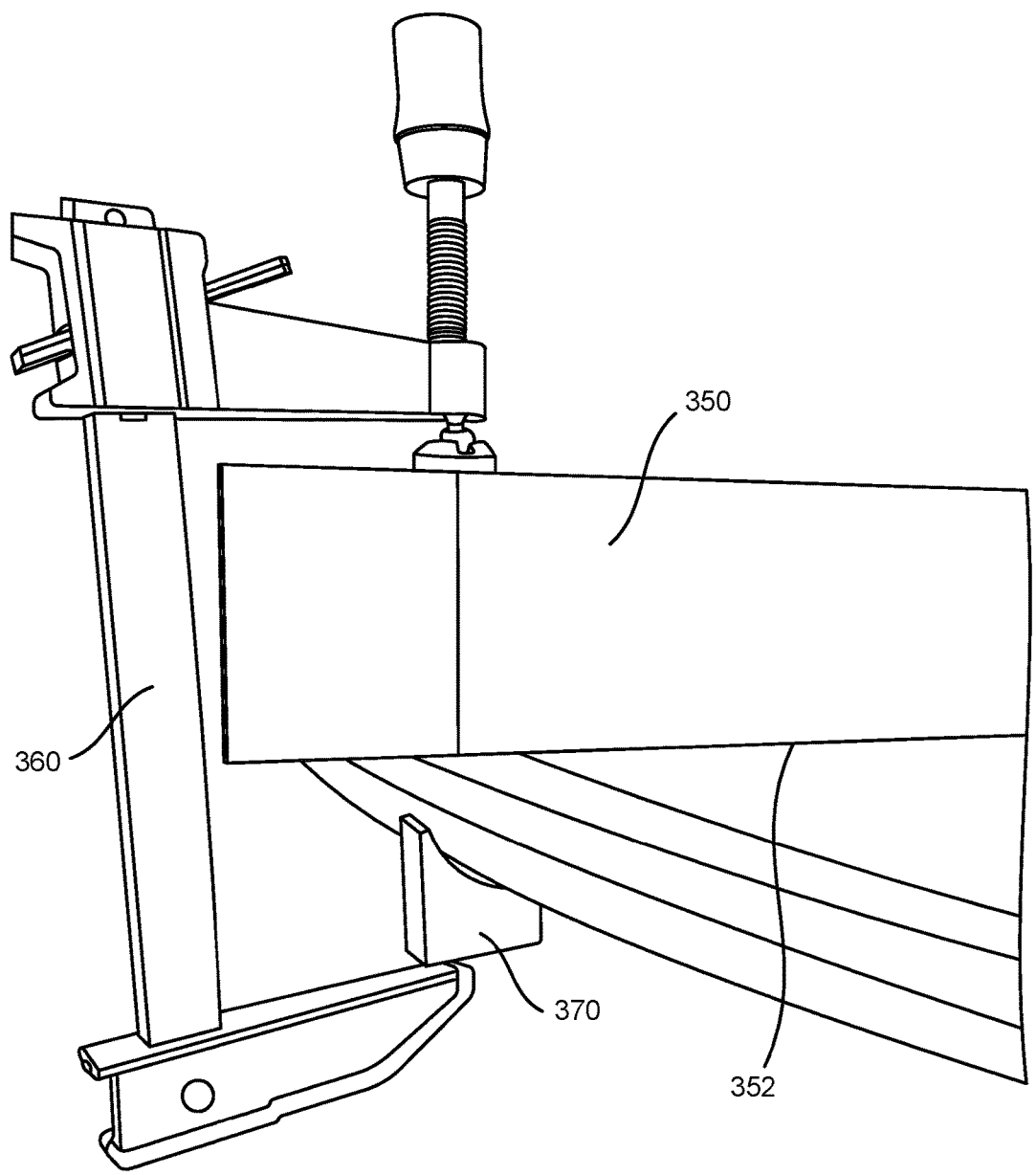
FIG. 14 is a drawing of an exemplary embodiment of a laminated frame with clamping for deck planking.

In various exemplary embodiments, top and bottom decking surfaces of the board may be formed from strip planking using balsa wood strips or any other suitable materials. Referring to FIGS. 12-14, in various exemplary embodiments strips of balsa wood or any other appropriate material may be cut to fit and placed extending longitudinally the length of the board. The strips 340 may be attached using adhesives on all abutting surfaces, and can be positioned and held in place using a system of forms 350 and clamps 360 to achieve the desired shape for each surface. Such forms 350 can be shaped such as along bottom surface 352 to position and hold the strip planking in the correct position while the adhesive sets. To achieve proper clamping pressure, shims 370 shaped to the rail contours may also be used to provide appropriate clamping surfaces on the other side of the surfboard. While only a single set of clamps and forms is shown in the illustrations, it will be readily understood by those skilled in the art that any number of sets of clamps and forms can be used to provide appropriate forming and pressure along the entire strips of planking. Such strip planking may be fitted such that it extends slightly above the adjacent laminated frame to allow for the removal of material to obtain the final desired shape. Fine shaping can then be done using appropriate tools such as sandpaper to smooth out seams and achieve final contours.

Figure 15:
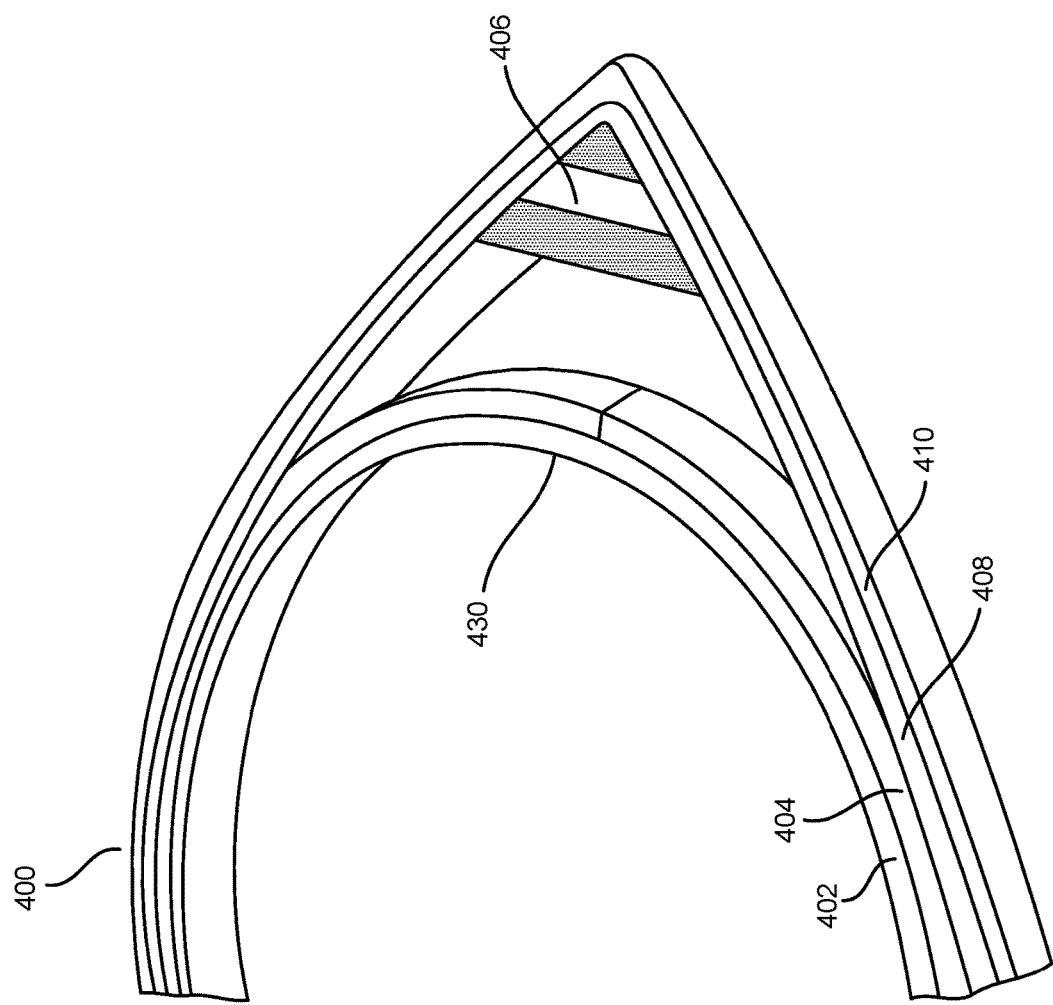
FIG. 15 is a drawing of the nose portion of an exemplary embodiment of a laminated frame with internal structural elements built using some of the laminate layers.

Referring to FIG. 15, in various exemplary embodiments, internal structural elements can also be built using some of the laminate layers of the laminated frame 400. For example, the first several innermost laminates (e.g. laminates 402 and 404) can be formed into a lateral internal member 430 while the remaining layers of the laminate frame (e.g. laminates 408 and 410) form the outer shape of the laminated frame 400. Using some of the laminates to create such internal structural elements can create both striking aesthetic features and an extremely strong internal frame that can be designed to obtain specific flex and performance characteristics. While shown in the nose section of a board, such internal structural elements can be formed in a variety of different locations throughout the board.

What is claimed is:

1. A surfboard comprising: a rigid laminated frame extending along the side rails of the surfboard; the laminated frame comprising three or more layers of wood laminates; wherein the laminated frame has been formed to the shape of the rocker of the surfboard; and wherein the laminated frame is formed to the shape of the rocker of the surfboard using a rocker table.

2. The surfboard of claim 1, wherein the wood laminates are not made of balsa wood.

3. The surfboard of claim 1, wherein some of the wood laminates are made of balsa wood and some of the laminates are made of wood that is not balsa wood.

4. The surfboard of claim 1, further comprising one or more lateral members extending between opposing sides of the laminated frame and wherein the lateral members are circular in cross-section.

5. The surfboard of claim 4, wherein the lateral members are wood dowels.

6. The surfboard of claim 4, wherein one or more supports connect the one or more lateral members to the top surface of the surfboard.

7. The surfboard of claim 1, wherein two or more layers of wood laminates form an internal structure extending laterally across the laminated frame from one side to the other.

* * * * *